(12) United States Patent
Nakagome et al.

(10) Patent No.: US 8,958,634 B2
(45) Date of Patent: Feb. 17, 2015

(54) IMAGE PROCESSING DEVICE THAT DISPLAYS RETRIEVED IMAGE SIMILAR TO TARGET IMAGE

(71) Applicant: Casio Computer Co., Ltd., Tokyo (JP)

(72) Inventors: Kouichi Nakagome, Saitama (JP); Shigeru Kafuku, Tokyo (JP); Kazuhisa Matsunaga, Tokyo (JP); Michihiro Nihei, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/847,673

(22) Filed: Mar. 20, 2013

(65) Prior Publication Data

US 2013/0251253 A1 Sep. 26, 2013

(30) Foreign Application Priority Data

Mar. 21, 2012 (JP) ................................. 2012-064527

(51) Int. Cl.
*G06K 9/00* (2006.01)
*G06F 17/30* (2006.01)

(52) U.S. Cl.
CPC ...... *G06F 17/30247* (2013.01); *G06F 17/3025* (2013.01); *G06F 17/30259* (2013.01)
USPC ............ 382/165; 382/195; 382/218; 382/305

(58) Field of Classification Search
CPC .......... G06F 17/30247; G06F 17/3025; G06F 17/30259; H04N 1/00127; H04N 1/00244; H04N 1/00336; H04N 1/19594; H04N 1/195
USPC ............ 382/165, 218, 305, 167, 19; 707/758, 707/722; 715/64, E17.014; 348/E05.031, 348/77, E07.091
See application file for complete search history.

(56) References Cited

U.S. PATENT DOCUMENTS

| | | | | |
|---|---|---|---|---|
| 6,502,105 | B1 * | 12/2002 | Yan et al. ............................... | 1/1 |
| 7,016,532 | B2 * | 3/2006 | Boncyk et al. ................ | 382/165 |
| 7,392,233 | B2 * | 6/2008 | Tanaka ................... | 1/1 |
| 7,899,243 | B2 * | 3/2011 | Boncyk et al. ................ | 382/165 |
| 8,269,787 | B2 * | 9/2012 | Bogart et al. ................. | 345/590 |
| 8,436,853 | B1 * | 5/2013 | Hickman et al. .............. | 345/419 |
| 8,520,942 | B2 * | 8/2013 | Boncyk et al. ................ | 382/165 |
| 8,826,863 | B2 * | 9/2014 | Skvorc, II ..................... | 119/712 |
| 8,843,478 | B1 * | 9/2014 | Jing et al. ...................... | 707/723 |
| 2002/0090132 | A1 * | 7/2002 | Boncyk et al. ................ | 382/154 |
| 2004/0208372 | A1 * | 10/2004 | Boncyk et al. ................ | 382/181 |

(Continued)

FOREIGN PATENT DOCUMENTS

| | | | | |
|---|---|---|---|---|
| JP | 2007-133816 A | | 5/2007 | |
| JP | 2007133816 A | * | 5/2007 | .............. G06F 17/30 |

*Primary Examiner* — Mekonen Bekele
(74) *Attorney, Agent, or Firm* — Holtz, Holtz, Goodman & Chick PC

(57) ABSTRACT

The image acquisition unit 41 acquires an image including an object. By comparing information related to the shape of a relevant natural object that is included as the object in the target image acquired by the image acquisition unit 41, and information related to respective shapes of a plurality of types prepared in advance, at least one flower type for the natural object in question is selected. The secondary selection unit 43 then selects data of a representative image from among data of a plurality of images of different color, of the same flower type as prepared in advance, for each of at least one flower type selected by the primary selection unit 42, based on information related to color of the relevant natural object included as the object in the image acquired by the image acquisition unit 41.

10 Claims, 4 Drawing Sheets

(56) References Cited

U.S. PATENT DOCUMENTS

| | | | |
|---|---|---|---|
| 2007/0078846 A1* | 4/2007 | Gulli et al. | 707/5 |
| 2008/0063276 A1* | 3/2008 | Vincent et al. | 382/182 |
| 2009/0141986 A1* | 6/2009 | Boncyk et al. | 382/209 |
| 2010/0076867 A1* | 3/2010 | Inoue et al. | 705/27 |
| 2010/0245614 A1* | 9/2010 | Matsunaga | 348/222.1 |
| 2011/0025834 A1* | 2/2011 | Chen et al. | 348/77 |
| 2011/0099493 A1* | 4/2011 | Yu et al. | 715/764 |
| 2013/0022275 A1* | 1/2013 | Inoue et al. | 382/195 |
| 2013/0121575 A1* | 5/2013 | Kim et al. | 382/167 |

* cited by examiner

IMAGE PROCESSING DEVICE THAT DISPLAYS RETRIEVED IMAGE SIMILAR TO TARGET IMAGE

This application is based on and claims the benefit of priority from Japanese Patent Application No. 2012-064527, filed on 21 Mar. 2012, the content of which is incorporated herein by reference.

BACKGROUND OF THE INVENTION

1. Field of the Invention

The present invention relates to an image processing device, an image processing method and storage medium, to display a retrieved image similar to a target image.

2. Related Art

Conventionally, on discovering an unknown plant a user may take an image of the plant in question using an imaging device, and thereafter, by comparing the captured image in which the plant is shown, and a plurality of images in which known plants are shown (for example, images published in an encyclopedia), may perform the task of identifying the type of the plant in question.

To support this type of user task, technology exists in which use is made of a database that stores multiple image data in which all kinds of plants are shown, and comparison processing is performed to compare data of the captured image showing a plant whose type or the like is desired to be identified, and data of respective images inside the database.

Here, the data of a captured image showing a plant whose type is desired to be identified is referred to below as "target image data", with the meaning of data that is a target for comparison processing.

Japanese Unexamined Patent Application, Publication No. 2007-133816 discloses technology for narrowing down, from multiple image data stored in a database, the number of items of image data that possibly show a plant of the same type as the target image, in order words the number of images similar to the target image (more precisely, similar to the plant image), and for displaying the narrowed-down plurality of candidate images together with the target image.

SUMMARY OF THE INVENTION

According to an aspect of the present invention, an image processing device includes:

an image acquisition unit that acquires an image including an object;

an information comparison unit that compares information related to the image acquired by the image acquisition unit with information related to types of images recorded in a recording unit;

a first selection unit that selects types corresponding to the object, based on a comparison result by the information comparison unit;

a second selection unit that selects a representative image for each of the types selected by the first selection unit, based on information related to the acquired image; and a display control unit that controls each representative image selected by the second selection unit to be displayed in a display unit.

The first selection unit selects the types, based on the information related to the shape of the object; and the second selection unit selects the representative image for each of the types, based on the information related to the color of the object.

According to an aspect of the present invention, an image processing method, executed by an image processing device, includes an image acquisition step of acquiring an image including an object;

an information comparison step of comparing information related to the image acquired in the image acquisition step with information related to types of images recorded in a recording unit;

a first selection step of selecting types corresponding to the object, based on a comparison result in the information comparison step;

a second selection step of selecting a representative image for each of the types selected in the first selection step, based on information related to the acquired image ; and a display control step of controlling each representative image selected in the second selection step to be displayed in a display unit.

According to an aspect of the present invention, a storage medium has stored therein a computer readable program, and the program causes a computer to function as an image acquisition unit that acquires an image including an object;

an information comparison unit that compares information related to the image acquired by the image acquisition unit with information related to types of images recorded in a recording unit;

a first selection unit that selects types corresponding to the object, based on a comparison result by the information comparison unit;

a second selection unit that selects a representative image for each of the types selected by the first selection unit, based on information related to the acquired image; and a display control unit that controls each representative image selected by the second selection unit to be displayed in a display unit.

DETAILED DESCRIPTION OF THE INVENTION

A description is given below concerning embodiments of the present invention, using the drawings.

Figure 1:
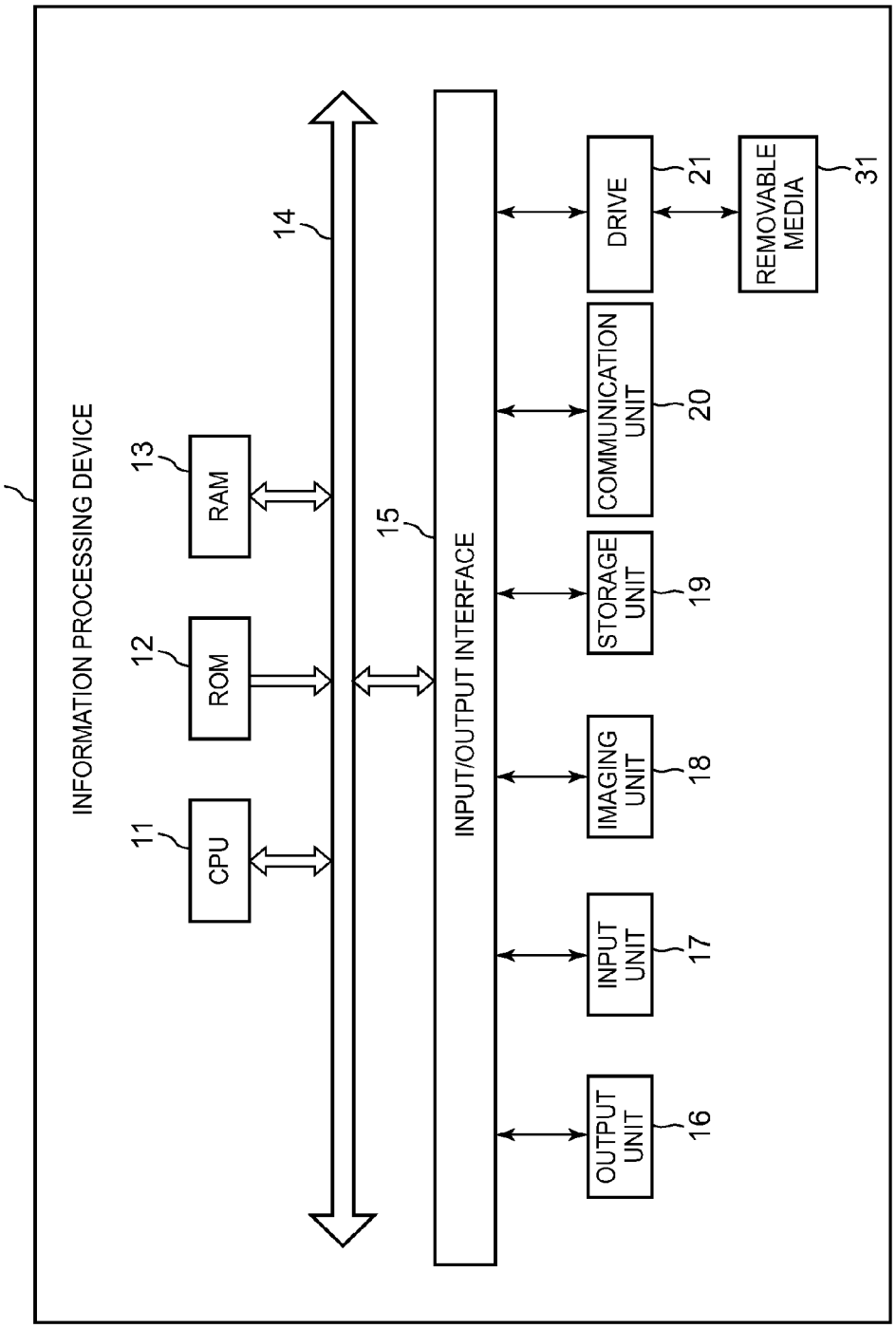
FIG. 1 is a block diagram showing a configuration of hardware of an image processing device according to an embodiment of the present invention.

FIG. 1 is a block diagram showing a configuration of hardware of an image processing device according to a first embodiment of the present invention.

The image processing device 1 is configured, for example, as a mobile telephone that can connect to the Internet.

The image processing device 1 is provided with a CPU (Central Processing Unit), a ROM (Read Only Memory) 12, a RAM (Random Access Memory) 13, a bus 14, an input/ output interface 15, an output unit 16, an input unit 17, an imaging unit 18, a storage unit 19, a communication unit 20, and a drive 21.

The CPU 11 executes various types of processing in accordance with a program recorded in the ROM 12, or a program loaded from the storage unit 19 to the RAM 13.

The RAM 13 stores, as appropriate, data necessary for the CPU 11 to execute the various types of processing.

The CPU 11, the ROM 12 and the RAM 13 are connected together via the bus 14. The input/output interface 15 is also connected to the bus 14. The output unit 16, the input unit 17, the imaging unit 18, the storage unit 19, the communication unit 20, and the drive 21 are connected to the input/output interface 15.

The output unit 16 is configured by a display, a speaker, and the like, and outputs an image or voice.

The input unit 17 is configured by various types of button or the like, and receives input of various types of information in accordance with a user instruction operation. It is to be noted here that various types of button include not only hardware buttons, but also software buttons displayed on a screen of the output unit 16. That is, the input unit 17 is configured to also include touch panels stacked in a display of the output unit 16.

The imaging unit 18 captures an image of an object, and supplies data of the image (referred to below as "captured image") including the image of the object in question.

The storage unit 19 is configured by a hard disk, a DRAM (Dynamic Random Access Memory), or the like, and in addition to various types of image data and captured image data, stores various types of program such as application programs and the like.

The communication unit 20 controls communication performed between other devices (not shown in the drawings) via a network including the Internet.

Removable media 31, such as a magnetic disk, an optical disk, a magneto-optical disk, a semiconductor memory, or the like, is mounted as appropriate to the drive 21. A program read from the removable media 31 by the drive 21 is installed to the storage unit 19 as necessary. Furthermore, the removable media 31 can also store various types of data such as image data stored in the storage unit 19, similarly to the storage unit 19.

Figure 2:
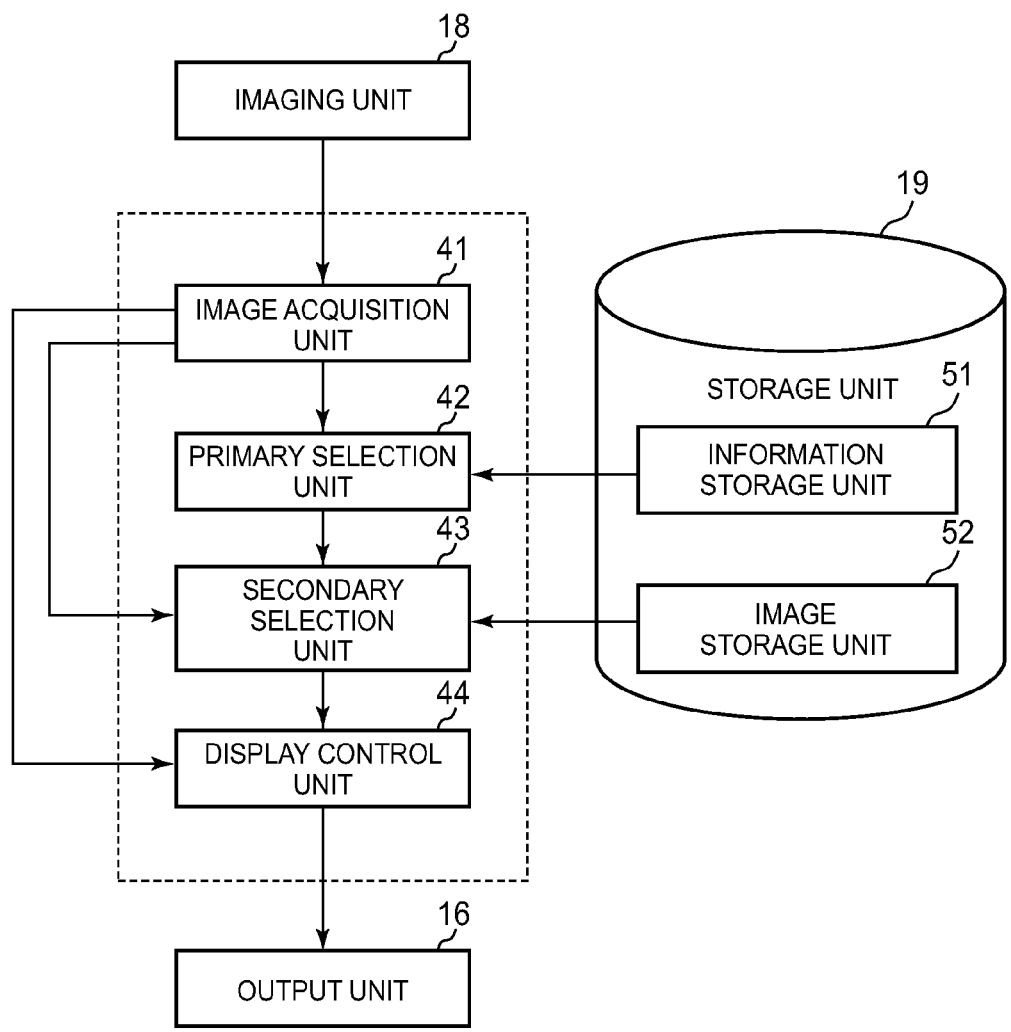
FIG. 2 is a functional block diagram showing, within a functional configuration of the image processing device of FIG. 1, a functional configuration for executing representative image display processing.

FIG. 2 is a functional block diagram showing, within a functional configuration of this type of image processing device 1, a functional configuration for executing representative image display processing.

The representative image display processing refers to the following type of processing that is started with a user pressing down on a power supply button, not shown in the drawings, as a trigger. That is, the representative image display processing is a series of processes: selecting one or more types based on characteristic information of the shape of an object included in a target image, further selecting one representative image from each selected type based on characteristic information of the color of the object, and displaying each representative image in question, together with the target image.

Here, an image, including an object that a user wishes to identify, is called a "target image" in the present embodiment. Furthermore, among a plurality of images including various types of objects of flowers that are stored in advance in a database or the like, an image which may include an object of the same type of flower as the target image is called a "candidate image" in the present embodiment.

In a case where execution of the representative image display processing is controlled by the CPU 11, an image acquisition unit 41, a primary selection unit 42, a secondary selection unit 43, and a display control unit 44 operate.

Furthermore, an information storage unit 51 and an image storage unit 52 are provided, as a region of the storage unit 19 of the image processing device 1. It is to be noted that providing the information storage unit 51 and the image storage unit 52 as a region of the storage unit 19 is an example, and it may be otherwise provided, for example, as a region of the removable media 31.

The image acquisition unit 41 acquires data of a captured image outputted from the imaging unit 18, for example, as data of the target image.

There is no particular limitation with regard to an object included in the target image, but in the present embodiment, among natural objects, the object is taken to be a flower, as a plant that has a diversity of colors. That is, the user operates the image processing device 1, and captures an image of a flower which is desired to be identified. Thereupon, data of the captured image including the flower is outputted from the imaging unit 18. The image acquisition unit 41 acquires data of the captured image as data of the target image.

In this way, the image acquisition unit 41, with the input unit 17 receiving an image acquisition operation by the user as a trigger, for example, acquires data of the captured image as data of the target image. The image acquisition unit 41 supplies data of the acquired target image to the primary selection unit 42.

It is to be noted that in the example of FIG. 2, a supply source of the data of the target image is the image unit 18, but there is no particular limitation to this, and any supply source is possible. For example, the image acquisition unit 41 can acquire data of an image held in another device in a network such as the Internet, as data of the target image via the communication unit 20. Furthermore, for example, the image acquisition unit 41 can acquire data of an image stored in the removable media 31 as data of the target image via the drive 21.

The primary selection unit 42 first identifies flower types, as a primary selection for the target image supplied from the image acquisition unit 41.

Specifically, information by which a flower type can be classified is stored in the information storage unit 51. Here, the information is related to a shape, a pattern, a color, or a combination thereof. However, in the present embodiment, data of images of flowers are classified into the flower types based on flower shape, so that each flower type includes data of images of flowers with similar shapes. Then, information of a single shape representing each flower type is stored in the information storage unit 51 as type information.

Therefore, the primary selection unit 42 identifies, from among N (N is an integer) flower types, m types (m is an integer less than or equal to N) having a high probability of being of the same flower type as the flower included in the target image.

More specifically, the primary selection unit 42 extracts characteristic information related to the flower included in the target image in question, based on the data of the target image. The primary selection unit 42, with respect to the extracted characteristic information, then calculates a Euclidean distance from each type information stored in the information storage unit 51, to calculate degree of similarly with respect to the target image. The primary selection unit 42, based on the primary selection result, selects 1st to m-th types corresponding to respective characteristic information of 1st to m-th degree of similarity, as candidates with high probability of being the same flower type as the flower included in the target image.

It is to be noted that a description is given concerning a specific example in which a flower type is selected by the primary selection unit 42, making reference to the drawings described later.

The secondary selection unit 43 selects as a representative image, data of a flower image whose color is the same or similar to that of the flower in the target image, from among data of a plurality of images (image group) that include flower images with different colors of the same flower type as stored in advance, for each of the flower types selected by The primary selection unit 42, based on information related to color of an object included in the data of the target image acquired by the image acquisition unit 41.

Specifically, color information by which flower color can be classified and images corresponding thereto are stored in the image storage unit 52. There is no particular limitation to the color information stored in the image storage unit 52, and for example, information of shape of an object in an image of each flower type can also be used. However, in the present embodiment, the characteristic information related to colors of one or more object images in each of M (M is an integer) types are stored in the image storage unit 52 as color information.

Accordingly, the secondary selection unit 43 selects a representative image with regard to each of 1st to m-th types among the flower types selected by the primary selection unit 42.

More specifically, the secondary selection unit 43 extracts characteristic information related to the color of the object included in the target image, based on the data of the target image. With regard to the extracted characteristic information, the secondary selection unit 43 then calculates a Euclidean distance from the color information (characteristic information) of one or more object images in terms of each type information stored in the image storage unit 52, to calculate a degree of similarity with respect to the target image. Based on the secondary selection result, with regard to each of the 1st to m-th types among the flower types selected by the primary selection unit 42, the secondary selection unit 43 then selects an image corresponding to each of the 1 to m-th types with respective characteristic information having the highest degree of similarity, as a representative image with high probability of having the same color as the flower included in the target image.

It is to be noted that a description is given concerning a specific example in which representative images are selected by the secondary selection unit 43, making reference to FIGS. 4A-4C which are described later. The secondary selection unit 43 supplies data of the selected representative image to the display control unit 44.

The display control unit 44, with the representative images selected by the secondary selection unit 43 executes control to display the target image and one or more candidate images disposed for each flower type.

Figure 3:
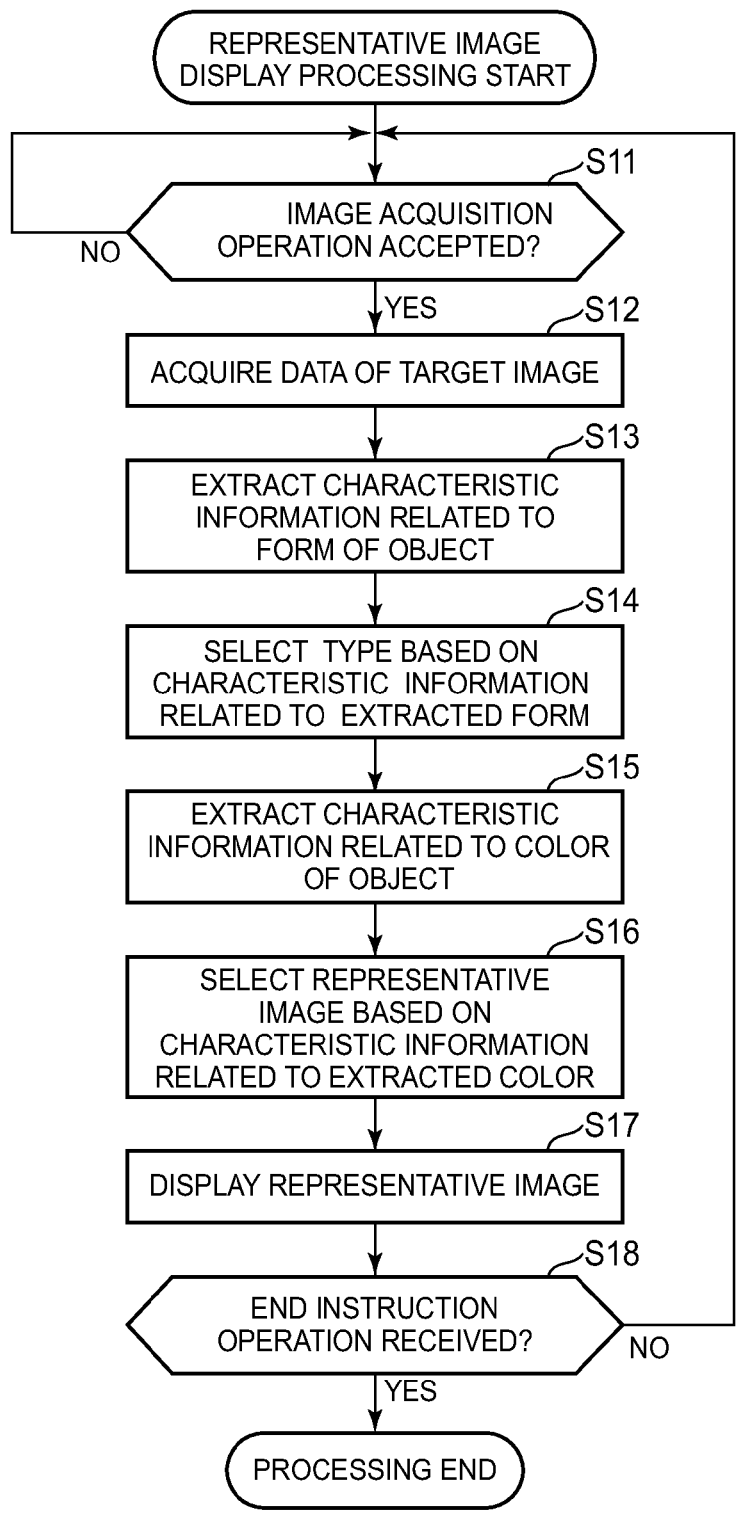
FIG. 3 is a flowchart describing flow of the representative image display processing executed by the image processing device of FIG. 1 that has the functional configuration of FIG. 2.

Next, referring to FIG. 3, a description is given concerning representative image display processing executed by the image processing device 1 of the functional configuration of FIG. 2.

FIG. 3 is a flowchart describing flow of the representative image display processing executed by the image processing device 1 of FIG. 1 having the functional configuration of FIG. 2.

The representative image display processing starts with the trigger of the power supply button of the input unit 17 (refer to FIG. 1) of the image processing device 1 being pressed by a user, and the following processing is repeatedly executed.

In step S11, the image acquisition unit 41 determines whether or not to accept an image acquisition operation based on an operation of the input unit 17 by the user. In a case in which the image acquisition operation is not accepted, a determination of NO is made in step S11, and processing returns to step S11. That is, the processing of step S11 is repeatedly executed until the image acquisition operation is accepted, and the representative image display processing goes into a waiting state. On the other hand, in a case in which the image acquisition operation is accepted, a determination of YES is made in step S11, and processing proceeds to step S12.

In step S12, the image acquisition unit 41 acquires data of the target image from the imaging unit 18.

In step S13, the primary selection unit 42 extracts characteristic information related to the shape of the object included in the target image acquired in step S12.

In step S14, the primary selection unit 42 selects a candidate for each flower type based on the characteristic information related to the shape of the object extracted in step S13. Specifically, the primary selection unit 42 selects the 1st to m-th types respectively corresponding to the 1st to m-th characteristic information items with high degree of similarity to the target image, as candidates with high probabilities of being of the same flower type as the flower included in the target image.

In step S15, the secondary selection unit 43 extracts characteristic information related to color of the object included in the captured image acquired in step S13.

In step S16, the secondary selection unit 43 selects a representative image from the candidates for each flower type selected in step S14 based on the characteristic information related to color extracted in step S15. Specifically, the secondary selection unit 43 selects, among a population of candidates of the 1st to m-th types selected in step S14, images with high degrees of similarity to characteristic information related to color extracted in step S13, as representative images from the image storage unit 52.

In step S17, the display control unit 44 executes control to display the representative images selected in step S16 as candidate images in the output unit 16. On this occasion, the display control unit 44 executes control to display the captured image acquired in step S12 together with the representative images in the output unit 16. A description is given with reference to FIGS. 4A-4C to be described later, concerning specific examples displaying the representative image by the display control unit 44.

In step S18, the CPU 11 determines whether or not an instruction to end the representative image display processing is received. In a case where the end instruction is not received, a determination of No is made in step S18, and processing returns again to step S11. On the other hand, in a case where the end instruction is received, a determination of YES is made in step S18, and the representative image display processing is ended.

Figure 4A:
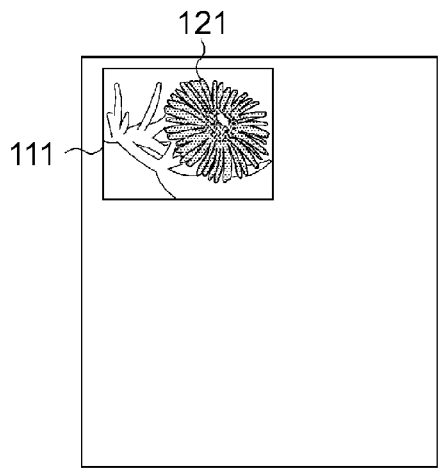
FIGS. 4A-4C are diagrams showing specific examples in which representative images are displayed in an output unit of the image processing device of FIG. 1.
Figure 4B:
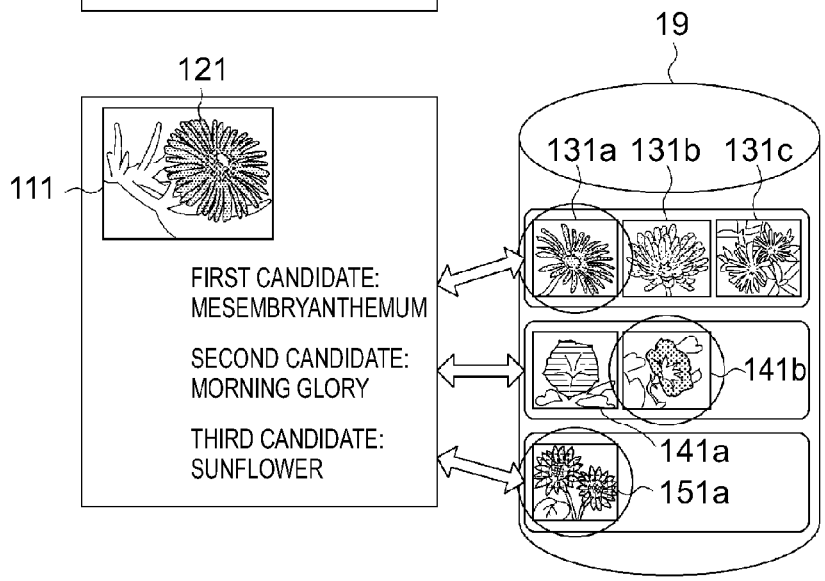
Figure 4C:
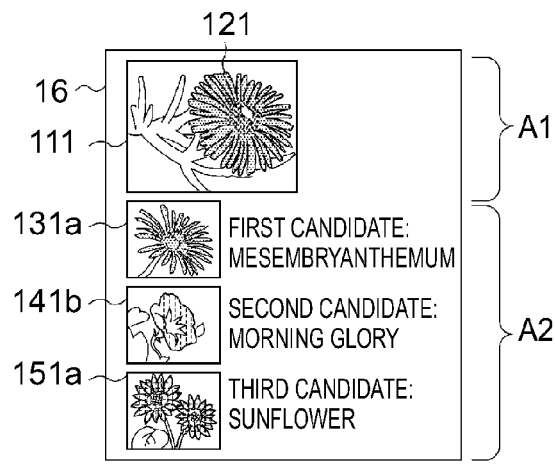

Next, a description is given concerning a specific example of processing to display the representative image, making reference to FIGS. 4A-4C.

FIGS. 4A-4C are diagrams showing specific examples of displaying the representative image in the output unit 16.

When an image acquisition operation is performed by a user operation of the input unit 17, data of the target image 111 is acquired by the image acquisition unit 41 from the imaging unit 18, as shown in FIG. 4A. In the present embodiment, the target image 111 includes a mesembryanthemum flower 121 of a red-purple color, which has color variety.

When the target image 111 is taken in, the primary selection unit 42 extracts characteristic information related to the shape of the mesembryanthemum flower 121 included in the captured image. The primary selection unit 42 performs pattern matching between the characteristic information related to the extracted shape, and characteristic information related to the shapes of a plurality of flower types, stored in the information storage unit 51, and calculates the degree of similarity with respect to each flower type.

The primary selection unit 42 then selects three flower types in decreasing order of the calculated degree of similarity. In the present embodiment, as selected types in decreasing order of degree of similarity, "mesembryanthemum", in first place, "morning glory" in second place, and "sunflower" in third place are selected.

When the flower types are selected, the secondary selection unit 43 extracts characteristic information related to color of the mesembryanthemum flower 121 included in the target image.

The secondary selection unit 43 performs pattern matching between the characteristic information related to the extracted color, and characteristic information related to the colors of objects included in images corresponding to flower types selected by the primary selection unit 42, among a plurality of images stored in the image storage unit 52, to calculate the degree of similarity with respect to each image.

The secondary selection unit 43, with regard to flower types (three flower types in decreasing order of degree of similarity in the present embodiment) selected by the primary selection unit 42, then selects one image from among a plurality of different color images of the same flower type, as a representative image.

Specifically, as shown in FIG. 4B, the secondary selection unit 43 selects, from among images 131a, 131b, and 131c with different colors corresponding to the "mesembryanthemum" that is the first flower type selected by the primary selection unit 42, the image 131a that has the highest degree of similarity related to color, as a representative image. Similarly, the secondary selection unit 43 selects, from among images 141a and 141b with different colors corresponding to the "morning glory" that is the second flower type selected by the primary selection unit 42, the image 141b that has the highest degree of similarity related to color, as a representative image. Since there is only one image 151a corresponding to the "sunflower" that is the third flower type selected by the primary selection unit 42, the secondary selection unit 43 selects the image 151a as the representative image. In the examples of FIGS. 4A-4C, different colors are shown according to type of hatching. The mesembryanthemum flower 121, the image 131a and the image 141b indicate a "red-purple color"; the image 131b indicates an "orange color"; the image 131c indicates a "white color"; the image 141a indicates a "blue color"; and the image 151a indicates a "yellow color".

As shown in FIG. 4C, the display control unit 44 executes control to display in the output unit 16 the respective representative images 131a, 141b, and 151a, selected by the secondary selection unit 43, and the target image 111 acquired by the image acquisition unit 41.

The display control unit 44 arranges and displays the target image 111 in a region A1 in the upper section of the output unit 16. Furthermore, the display control unit 44 respectively arranges and displays, in a region A2 in the lower section of the output unit 16, the representative image 131a of a "mesembryanthemum", the representative image 141b of a "morning glory" and the representative image 151a of a "sunflower" in an order according to high degree of similarity determined by the primary selection unit 42. Furthermore, the flower type names of the respective representative images: "mesembryanthemum", "morning glory" and "sunflower", are displayed at the side of the respective representative images 131a, 141b and 151a.

As in the above description, the image processing device 1 of the present embodiment is provided with the image acquisition unit 41, the primary selection unit 42, and the secondary selection unit 43. The image acquisition unit 41 acquires data of an image that includes an object (a natural object) as data of the target image. By comparing information (first information) related to the shape of the natural object in question that is included in the target image acquired by the image acquisition unit 41, and information (second information) related to respective shapes of a plurality of types prepared in advance that are stored (recorded) in the prescribed storage unit 19, the primary selection unit 42 selects flower types corresponding to the object. The secondary selection unit 43 then selects data of a representative image from among data of a plurality of images with different colors of the same flower type as prepared in advance, for each of flower types selected by the primary selection unit 42, based on information (second information) related to color of the natural object in question included in the target image acquired by the image acquisition unit 41.

In this way, it is possible to more easily identify the object within the target image, even in a case of identifying a natural object such as a flower where there is a large divergence within the same flower type having a plurality of colors, as where there is divergence between a representative image and a target image that is a target for retrieval by the user. That is, it is possible to perform identification of a flower type of a retrieval target by a primary selection, and furthermore it is possible to perform further color matching with regard to selected types, by a second selection. In this way, it is possible to more easily identify a target image that is a retrieval target. Furthermore, after narrowing down targets in a population to some extent by the primary selection, it is possible to realize improvement in processing speed by performing secondary selection.

In addition, the primary selection unit 42 of the image processing device 1, as information related to shape of an object, selects flower types of the natural object, based on information related to shape.

Furthermore, the secondary selection unit 43 selects a representative image for each flower type, based on information related to color of the object.

In this way, even in a case of a natural object having a characteristic (for example, flower color, shape, etc.) with large variation within flower type, or a case where perspective differs greatly according to the direction of image capture, it is possible to identify the flower type of the retrieval target based on shape, by the primary selection. As a result of the identification, in addition it is then possible to perform further color matching within the selected flower type, by secondary selection. In this way, it is possible to more easily identify a target image that is a retrieval target.

Furthermore, the image processing device 1 is additionally provided with the display control unit 44. The display control unit 44 controls display of the images respectively including the representative image and the relevant representative image for each flower type selected by the secondary selection unit 43.

In this way, it is possible to show the representative image to be presented to the user, together with the target image of the natural object such as an flower or the like, that has been acquired. Therefore, it is easy for the user to perform identification without oversight, even for a natural object such as a flower that has a variety of colors. The user can easily comprehend this, even in a case of a natural object such as a flower in which there is large variance in types, or where perspective differs greatly according to the direction of image capture. Therefore, it is possible to display a plurality of images that are image candidates similar to the retrieval target, in a shape by which identification of the retrieval target is easy for the user.

Furthermore, the image that includes the object acquired by the image acquisition unit 41 of the image processing device 1 is the image of a flower.

In this way, it is possible to more easily identify a flower with a variety of colors. That is, since it is possible to perform identification of the flower type of the retrieval target by the primary selection, and in addition to select a representative image by performing color matching for a flower having a variety of colors by the secondary selection, it is possible to more easily identify the image of a flower that is a retrieval target.

It is to be noted that the present invention is not limited to the embodiment as described above, and modifications and improvements within a scope in which an object of the present invention can be realized, are included in the present invention.

In the embodiment described above a description has been given in which the target image and the object of the representative images are flowers, but there is no particular limitation to this; it is sufficient as long as a determination can be made as to whether or not the relevant type is the same from a viewpoint of shape, and it is possible to use all kinds of items, such as plants outside of flowers, animals, and persons.

Furthermore, in the embodiment described above, the secondary selection unit 43 selects as a representative image an image with the highest degree of similarity related to color of the object of the target image from among a plurality of different colored images, but there is no limitation to this.

For example, the secondary selection unit 43 can select as a representative image an image having a p-th degree of similarity (p greater than or equal to 1 and less than or equal to n) related to the color of the object.

Furthermore, in the embodiment described above, the image processing device 1 to which the present invention is applied is described with a mobile telephone that can connect to the Internet as an example, but there is no particular limitation to this.

For example, the present invention can be generally applied to electronic devices having a display function. Specifically, for example, the present invention can be applied to notebook-type personal computers, digital cameras, television receivers, video cameras, mobile navigation devices, mobile telephones, portable game machines, and the like.

The abovementioned series of processing can be executed by hardware, or can be executed by software.

In other words, the function configuration of FIG. 3 is merely an example, and there is no particular limitation implied. That is, it is sufficient as long as a function that can execute the abovementioned series of processing as a whole is provided in the image processing device 1, and there is no particular limitation to the example of FIG. 2 as regards what functional block is used in order to realize this function.

Furthermore, one functional block may be configured by a hardware unit, or may be configured by a software unit, or may be configured by a combination thereof.

In a case of executing the series of processing by software, a program configuring the software is installed from a network or a storage medium to a computer or the like.

The computer may be a computer embedded in dedicated hardware. Furthermore, the computer may be computer that can execute various types of function by installing various types of program, and for example, may be a general usage personal computer.

A storage medium including this type of program may not only be configured by the removable media 31 of FIG. 1 distributed separately from the device main unit to provide the program to the user, but may also be configured by a storage medium provided to the user in a state where it is embedded in advance in the device main unit. The removable media 31, for example, is configured by a magnetic disk (including a floppy disk), an optical disk, a magneto-optical disk or the like. The optical disk, for example, may be configured by a CD-ROM (Compact Disk-Read Only Memory), DVD (Digital Versatile Disk), or the like. The magneto-optical disk is configured by an MD (Mini-Disk) or the like. Furthermore, the storage medium provided to the user in a state where it is embedded in advance in the device main unit, for example, is configured by the ROM 12 of FIG. 1 in which the program is recorded, or a hard disk included in the storage unit 19 of FIG. 1.

It is to be noted that in the present specification, a step of describing the program recorded in the storage media clearly includes processes performed chronologically following a sequence of the program, but need not necessarily be processed chronologically and may be executed in parallel or individually.

A description has been given above concerning several embodiments of the present invention, but these embodiments are merely examples and are not intended to limit the technical scope of the present invention. The present invention can have various other types of embodiment, and in addition, various modifications such as omissions and substitutions can be carried out within a scope that does not depart from the spirit of the present invention. These embodiments and modifications thereof are included in the scope and spirit of the present invention as described in the present specification, and are included in the claims and an equivalent scope thereof.

What is claimed is:

1. An image processing device comprising:
 a CPU that is configured to function as:
 an image acquisition unit that acquires an image including a target object;
 a comparison unit that compares a first characteristic of the target object in the acquired image with characteristics of a plurality of groups each including a plurality of images of objects;
 a first selection unit that selects, from the plurality of groups, at least two groups which have a common characteristic that is similar to the first characteristic of the target object, based on a comparison result by the comparison unit, wherein a number of the plurality of groups is larger than a number of the at least two groups;
 a second selection unit that selects, from each of the at least two groups, a representative image a characteristic of which is similar to a second characteristic of the target object, the second characteristic being different from the first characteristic; and
 a display control unit that controls a display to display representative images selected by the second selection unit.

2. The image processing device according claim 1, wherein:
the first characteristic relates to a shape of the target object, and the second characteristic relates to a color of the target object;
the first selection unit selects the at least two groups which have the common characteristic of a shape that is similar to the first characteristic of the target object relating to the shape of the target object; and
the second selection unit selects the representative image, from each of the at least two groups, the representative image having the characteristic of color that is similar the second characteristic of the target object relating to the color of the target object.

3. The image processing device according claim 1, wherein the CPU is further configured to function as:
an information obtaining unit that obtains information of the characteristics of the plurality of groups from a recording unit that records a plurality of groups a number of which is larger than the number of the plurality of groups the information of the characteristics of which are obtained by the information obtaining unit;
wherein the comparison unit compares the first characteristic of the target object with the information of the characteristics of the plurality of groups obtained by the information obtaining unit.

4. The image processing device according claim 1, wherein the target object is a flower.

5. An image processing method executed by an image processing device, the method comprising:
acquiring an image including a target object;
comparing a first characteristic of the target object in the acquired image with characteristics of a plurality of groups each including a plurality of images of objects;
first selecting, from the plurality of groups, at least two groups which have a common characteristic that is similar to the first characteristic of the target object, based on a comparison result of the comparing, wherein a number of the plurality of groups is larger than a number of the at least two groups;
second selecting, from each of the at least two groups, a representative image a characteristic of which is similar to a second characteristic of the target object, the second characteristic being different from the first characteristic; and
controlling a display to display representative images selected in the second step selecting.

6. A non-transitory computer-readable storage medium having stored thereon a program that is executable by a computer, the program causing the computer to function as:
an image acquisition unit that acquires an image including a target object;
a comparison unit that compares a first characteristic of the target object in the acquired image with characteristics of a plurality of groups each including a plurality of images of objects;
a first selection unit that selects, from the plurality of groups, at least two groups which have a common characteristic that is similar to the first characteristic of the target object, based on a comparison result by the comparison unit, wherein a number of the plurality of groups is larger than a number of the at least two groups;
a second selection unit that selects, from each of the at least two groups, a representative image a characteristic of which is similar to a second characteristic of the target object, the second characteristic being different from the first characteristic; and
a display control unit that controls a display to display representative images selected by the second selection unit.

7. The image processing device according to claim 1, wherein the display control unit controls the display to simultaneously display the image including the target object and the representative images.

8. The image processing device according to claim 1, wherein the CPU is further configured to function as:
a degree of similarity calculation unit that calculates a degree of similarity between the first characteristic and each of the characteristics of the plurality of groups,
wherein the first selection unit selects, from the plurality of groups, the at least two groups which have degrees of similarity to the first characteristic that are higher than those of other groups among the plurality of groups.

9. The image processing device according to claim 8, wherein the display unit control the display to display the representative images such that the representative images are displayed in order of the degrees of similarity of the at least two groups to which the representative images belong.

10. The image processing device according to claim 9, wherein the display control unit controls the display to display the representative images such that the representative images are displayed in order of decreasing degrees of similarity of the at least two groups to which the representative images belong.

* * * * *